United States Patent [19]

Pelizzoni

[11] 4,377,967
[45] Mar. 29, 1983

[54] TWO-PIECE PISTON ASSEMBLY

[75] Inventor: Winton J. Pelizzoni, Allentown, Pa.

[73] Assignee: Mack Trucks, Inc., Allentown, Pa.

[21] Appl. No.: 248,213

[22] Filed: Mar. 27, 1981

[51] Int. Cl.³ ............... F01B 31/08; F01B 31/10; F16J 1/08; F01P 3/12
[52] U.S. Cl. ............................. 92/186; 92/158; 92/159; 92/216; 123/41.35
[58] Field of Search .............. 220/324; 123/41.35; 92/219, 158, 159, 176, 186, 216

[56] References Cited

U.S. PATENT DOCUMENTS

| | | | |
|---|---|---|---|
| 1,744,250 | 1/1930 | Trechsel | 92/176 |
| 1,825,163 | 9/1931 | Schweter | 92/186 |
| 2,720,871 | 6/1952 | Morris | 92/186 |
| 2,815,011 | 12/1957 | Holt . | |
| 2,880,709 | 5/1957 | Sakraida | 123/41.35 |
| 3,336,884 | 8/1967 | Cornet . | |
| 3,360,644 | 12/1967 | Lillebostad | 220/324 |
| 3,805,677 | 4/1974 | Clary et al. . | |
| 4,011,797 | 3/1977 | Cornet | 92/186 |
| 4,056,044 | 11/1977 | Kamman et al. | 92/159 |
| 4,142,484 | 3/1979 | Buhl | 92/159 |
| 4,180,027 | 12/1979 | Taylor . | |
| 4,270,494 | 6/1981 | Garter et al. | 92/176 |
| 4,286,505 | 9/1981 | Amdall | 92/186 |

FOREIGN PATENT DOCUMENTS 79978 2/1920 Austria ............... 123/41.35

OTHER PUBLICATIONS

Development and Operating Experience of Pistons for Medium Speed Diesel Engines Munro and Griffiths, Wellworthy Topics No. 74, Spring/Summer 1980, pp. 4-11.

Primary Examiner—Martin P. Schwadron
Assistant Examiner—Richard L. Klein
Attorney, Agent, or Firm—Bernard, Rothwell & Brown

[57] ABSTRACT

A two-piece piston assembly comprises an upper portion or a ring carrier part that may be made of malleable iron, cast iron, or a similar iron, and a lower portion or cross-head part, referred to as a skirt, that may be made of aluminum or an alloy thereof. The assembly is configured to increase the contact of cooling liquid with the underside of the crown and eliminate problems accompanying undue heating in this area of the piston. The cocktail-shaker action of the two-piece piston assembly is employed to enhance the cooling effect. A separate cup-like device is secured around the outside of the lower end of the crown member of the piston and is thus positioned between the upper and lower portions of the piston to retain the oil and effectively deliver it to the underside of the crown.

13 Claims, 6 Drawing Figures

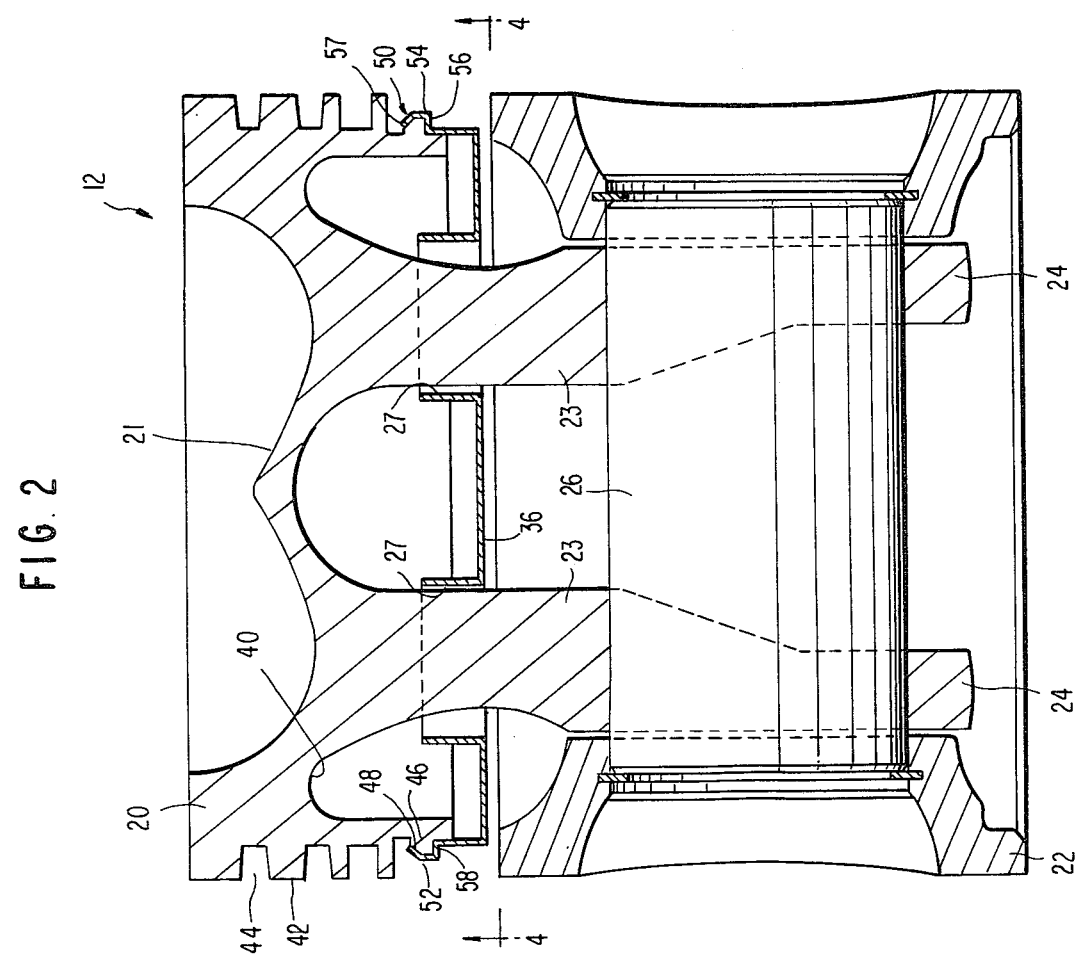
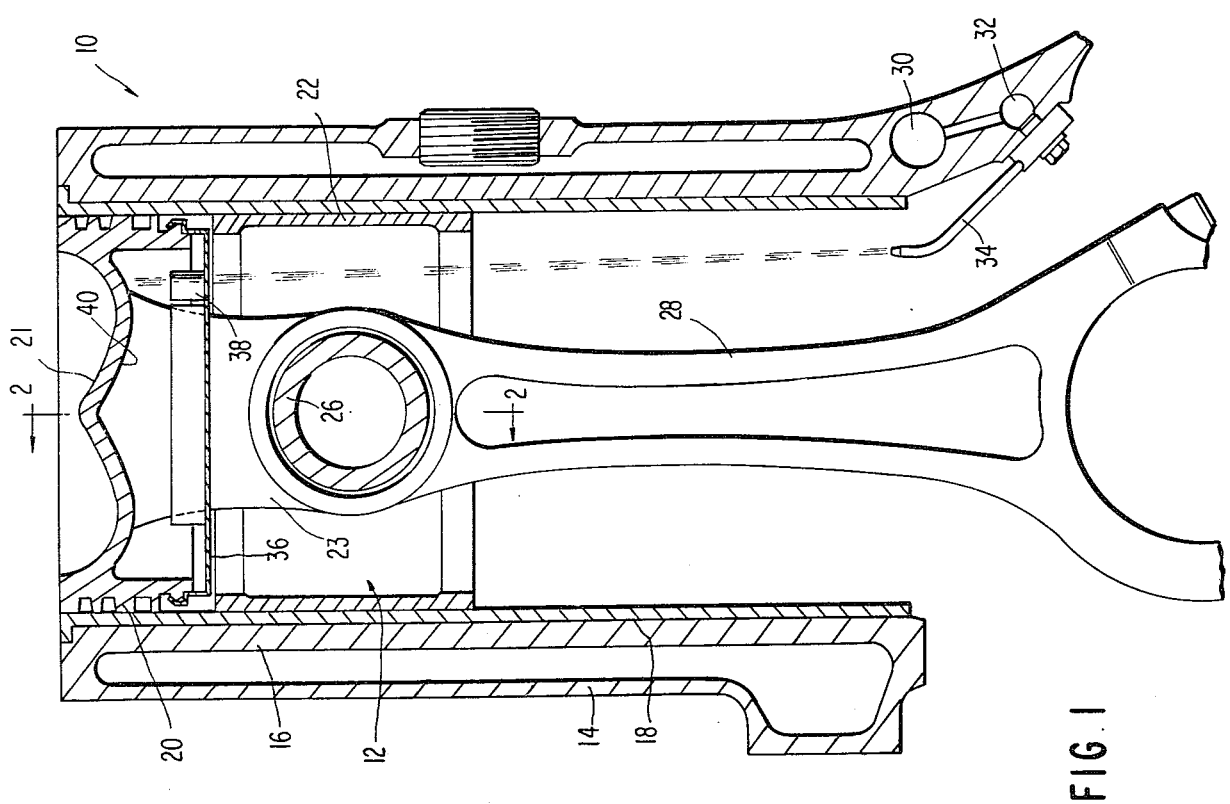

TWO-PIECE PISTON ASSEMBLY

This invention relates to a two-piece piston, and more particularly, the piston is constructed to provide increased and more efficient contact of cooling oil with the underside of the crown of pistons in internal combustion engines.

BACKGROUND OF THE INVENTION

In internal combustion engines the pistons employed have generally been of two types: single-piece pistons and two-piece pistons. More recently where weight has been a factor, light metals such as aluminum have been employed in both of these types of pistons. Where aluminum or other light metal is used it has often been necessary for reinforcing purposes to utilize a nickel-containing alloy insert for the top ring groove. When the aluminum piston is of the single-piece type, there has been employed a single permanent mold casting to provide pistons which have rather heavy sections from around the piston ring boss to the top of the head adjacent the combustion chamber. The heavy sections are required in order to provide adequate strength to withstand the high peak firing pressures in the cylinder. Aluminum, in addition to being light as mentioned above, has excellent heat conductivity attributes. But, in spite of these advantages, on high output engines it has been found necessary to provide oil jet cooling to the underside of the piston in order to minimize temperatures around the combustion chamber and around ring lands. The construction is such that the head section above the piston pin carries all the rings to provide the combustion seal and, at the same time, provide the oil control for suitable consumption.

In aluminum-containing piston heads the top compression ring groove insert is necessarily moved quite a bit down from the upper edge of the piston in order to provide adequate strength in the head from the top ring groove to the upper end of the piston. If the top ring groove were moved upwardly there would be a possibility of failure because of the lack of strength created by the location of this groove in conjunction with the properties of the lightweight aluminum metal between the insert and the combustion chamber cavity, this is between the insert and the upper edge of the piston.

Since aluminum alloys at normal operating temperatures in an internal combustion engine will lose strength and at high temperatures actually may become plastic, the material section between the top ring groove insert and the combustion chamber or upper part of the piston must remain adequate to prevent failure. Because the strength of the aluminum at operating temperature is low, adequate sections must also be maintained behind the ring grooves which makes it more difficult to provide adequate cooling from the oil discharged against the underside of the crown of the piston by the use of jets.

The large metal cross-sections generally require a complicated shape for the casting employed to form the pistons, and, therefore, it is necessary to carefully develop the outer contour of the piston (that part of the piston that contacts the cylinder sleeve or cylinder liner). This shape is a compound combination of ellipses, tapers and radii that call for very special tooling and grinding operations so as to maintain suitable skirt contact on the major and minor thrust surfaces in the worst possible operating conditions. These peculiarly finished contours, as previously stated, are required to compensate for the basic cross-sectional differences in the casting and the changes in dimension resulting from temperature increases.

Piston configuration is complicated by another heat related characteristic of aluminum. Aluminum has a rather high expansion rate, and, because the upper portion or head of the piston is the hottest and is supported from the lower skirt which is the coolest portion, a rather wide clearance between the piston ring lands and the bore will exist when cold, but the clearance will diminish under the heat of operation. This means that the piston rings will have to be of a design and shape to cope with the temperature and clearance variations (radial and axial) and still maintain the compression seal and lubricant seal desired for an acceptable ultimate operation life.

As noted above when the top part or head of the piston is made of aluminum it has been necessary to provide a nickel-containing alloy insert between the aluminum of the head and the topmost ring. Because the top ring is exposed to the highest temperature and pressure, it cannot survive satisfactorily when working directly against aluminum. Also, the aluminum groove wears badly when the piston ring acts directly on the aluminum. By employing the nickel-containing alloy insert the necessary load-carrying capacity and wear resistance can be achieved. As mentioned before, due to the size and shape of the aluminum crown this top ring is located further from the top of the piston than in a piston made with heavier metal which in the case of the aluminum means a relatively large unoccupied volume exists above the top ring land and between the piston and the cylinder liner. This is not desirable, because it adds heat to the top of the piston above and around its side down to the top ring land. Furthermore, because of the clearance between the crown above the ring top land and the bore, the piston usually collects excessive amounts of carbon which tends to close the clearance and eventually creates disturbances between the piston and the cylinder liner bore. In addition, there is an adverse effect on emissions since the exhaust gases will contain increased amounts of hydrocarbons.

To overcome some of the problems discussed above, a two-piece piston assembly is used where the upper piece or head is made of cast iron, malleable iron or similar material with the lower or skirt portion, sometimes called the cross head, being made of aluminum-containing metals. Because of the increased strength of iron and iron alloys at high temperatures, the upper section can be made appreciably thinner throughout and does not require the piston ring inserts since the iron itself has suitable strength at the high temperatures. In addition, the top ring can be moved further upwardly when compared to its position on the aluminum piston head and as far as practical to the point where only the strength between the top ring groove and the upper portion of the head need be considered. Since the ring carrier portion of the piston is iron which has a relatively low expansion rate it can, of course, be made to larger diameters in a given cylinder liner thus minimizing the clearance changes between the piston head and the cylinder liner and the resultant changes in the axial and radial clearances. The construction of the cast iron ring carrier section is such that it is retained on the assembly by the piston pin in such a fashion that it is free to move about the pin axis irrespective of the position or rocking of the skirt. This means that the ring carrier should be much more stable, since it will be guided by the bore itself and not subjected to the thrust loads from the gas pressure relating to the cross head section of the assembly. Since the iron upper portion can be so much thinner, oil cooling will be enhanced, since it can contact a greater exposed surface area, provide cooling through the thinner sections and reduce the temperature gradient across the piston walls.

The lower section or cross head part of the piston can be made of aluminum-containing metal and is essentially a cylinder except for some bosses required for support around the piston pin. Since there is no gas loading on the skirt and inertial loading is at a minimum, the contact area between the aluminum skirt section and the pins can be minimized. Again because the skirt is separate from the head, it will not be subjected to heat transfer by conduction from the head section. Therefore, even though the skirt is aluminum it can be fitted more tightly to maintain a closer clearance with the cylinder liner under all operating temperatures. The need for complicated shapes on the cross head or aluminum thrust section will therefore be minimized.

However, even under these circumstances it may often be necessary to increase the cooling for the smaller and thinner top section to avoid head cracking and top ring scuffing which might otherwise result from the insufficient cooling provided by the normal continuous spray of oil to the underside of the piston crown or head.

Additional cooling of the crown of two-piece pistons, as well as one-piece pistons, has been provided by what is sometimes referred to as the cocktail shaker design. In these pistons an oil-retaining section or cup having an open upper surface is provided in the head section of the piston. Oil is retained in the cup and splashes or otherwise contacts the underside of the piston crown as it reciprocates in the cylinder. This cooling which is generally accompanied by oil-jet spraying of the underside of the crown has seemed to provide a possible solution to the cooling problem. It should be realized that the provision of the oil-retaining structure within the piston crown can be a difficult and expensive matter, and as a result the use of two-piece pistons of most desireable configuration has been seriously curtailed.

BRIEF DESCRIPTION OF THE INVENTION

The present invention is directed to an advantageous manner of providing an oil-retaining structure or cup in the crown of two-piece pistons. According to the present invention the oil-retaining cup is conveniently formed as a separate member. This member at its upper outer periphery is shaped so that is can be securely positioned on the lower outer side of the piston head which is suitably shaped to hold the cup. Due to the space between the separate head and skirt portions of the piston, the upper outside part of the oil-retaining cup can be inserted therebetween and into its secure position around the lower outside of the piston head. The oil-retaining cup can even be made of relatively thin materials such as sheet metal. In this fashion the cocktail-shaker effect can be easily and effectively provided.

Means of holding the oil retaining cup in place include pressing the cup over a machined part of the piston crown and then rolling a lip of the cup over a mating part. Alternatively a flared end can be retained against a mating part in the piston head by a collapsing type of piston ring which would have an OD slightly less than the bore ID so that the cup could never come out when the assembly is in the cylinder.

A grommet can be provided on the oil-retaining cup to allow the entry of a continuous oil spray from a jet which may be in the engine block. The inserted grommet should extend to at least the same height as the rest of the cup lip so as to retain a maximum amount of oil in the cup. With this system the oil lost from the cup by overflow or from piston reciprocation will flush through the clearance holes around openings provided in the cup for the head bosses to extend to the piston pin.

A BRIEF DESCRIPTION OF THE DRAWINGS

FIG. 1 shows a cross-section of a two-piece piston of the invention within a cylinder of an internal combustion engine.

FIG. 2 shows an enlarged cross-section of the two-piece piston shown in FIG. 1, removed from the cylinder and piston rod and taken along a plane perpendicular to that of FIG. 1.

DETAILED DESCRIPTION OF THE PREFERRED EMBODIMENT

Figure 3:
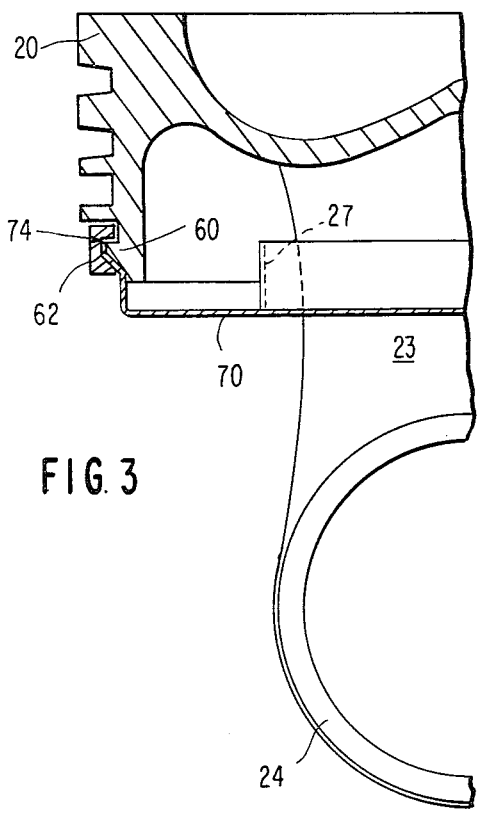
FIG. 3 shows a cross-section of a partial view of a head portion for a two-piece piston of another embodiment of the invention.

Referring to FIG. 1, there is shown an embodiment of the two-piece piston of the invention arranged in a cylinder of an internal combustion engine. A piston-cylinder assembly 10 of this arrangement includes a two-piece piston 12 located within cylinder block 14 for reciprocal movement during engine operation. A cylinder liner 18 is fitted within cylinder 16 of the cylinder block to circumscribe the two-piece piston 12 during reciprocal movement when the piston is subjected to combustion. Two-piece piston 12 includes a head or upper portion 20 which carries the piston rings and includes a crown 21 or otherwise sculptured portion to receive the primary impact of the force generated by the combustion in the cylinder. The second portion of the piston cylinder assembly 12 includes a skirt or lower portion 22 located within the cylinder beneath the head 20. These two elements, head 20 and skirt 22, are secured in the desired position relative to one another and to connecting rod 28 by a piston pin 26. More specifically, the head 20 of the piston includes downwardly extending pedestals 23 having bosses 24, as shown in FIG. 2, at the lower portion thereof which define a hole for receiving the piston pin 26. Similarly, the skirt portion 22 includes holes which register with those for the bosses of the head portion and also receive the piston pin 26 coaxially with the holes of the head 20. In this manner the piston pin 26 connects both head 20 and skirt 22 to the connecting rod 28.

Due to the high temperatures generated during combustion it is typically necessary to cool the two-piece piston 12 during engine operation. This is necessary to avoid damage, cracking, undue wear, etc. which would otherwise occur if the heat generated were not transferred away from the piston head. The cooling system for this purpose includes a main oil gallery 30 which extends through the cylinder block and provides a source of oil for cooling and lubrication. In communication with this main oil gallery 30 is a piston oil cooling gallery 32 which directs oil from the main gallery to a piston oil nozzle 34 for directing oil under pressure to the two-piece piston 12. Typically an oil pump is integrated in this system to provide the necessary pressure so that the oil when pumped to nozzle 34 will be sprayed upwardly toward the undersurface 40 of the piston.

In this embodiment a piston-oil retention cup 36 is arranged beneath the head 20 and above the skirt 22 of the two-piece piston 12. This cup 36 receives and holds oil directed from the underside 40 of the piston crown as the result of being sprayed upwardly from nozzle 34. Also the cocktail-shaker action created during the reciprocal action of the piston intermittently splashes oil against the underside or undersurface 40 of the piston during operation to flush a substantial portion of the underside 40 with cooling oil. A grommet 38 is provided in the cup 36 positioned above nozzle 34 so that the oil under pressure pumped to nozzle 34 can be delivered through cup 36 to the undersurface of the piston crown and ultimately collected in cup 36 for use in the cocktail-shaker action.

For purpose of discussing the details of the embodiment reference should be made to FIG. 2 where there is shown the two-piece piston 12 in a larger cross-sectional view taken along lines 2—2 of FIG. 1 with the cylinder and block portions having been deleted. As can be seen in this figure, the head 20 includes a series of lands 42 and grooves 44 for receiving piston rings (not shown). As is well known the piston rings engage the cylinder liner to prevent blow-by and maintain the piston in the proper disposition relative to the cylinder. In this configuration the lowermost land 46 is specially configured to cooperate with a portion of the piston oil retention cup 36 to retain the cup in the proper disposition between the two parts of the piston 12. For this purpose lowermost land 46 includes an angled surface 48 extending entirely around the circumference of the piston head 20. The angle of the surface as shown is approximately 45° to the piston axis but other convenient angles may be used. The other surfaces defining land 46 include an outer surface 52 parallel to the axis of the piston and a lower surface or land bottom 58 perpendicular thereto. The cup 36 includes an outer lip 50 which is configured in a complementary manner with the external surface of lowermost land 46 for retaining the cup in place. In the manufacturing process lip 50 of cup 36 can be rolled onto the lowermost land 46 such that the surfaces of lip 50 are essentially co-planar with the adjacent surfaces defining the lowermost land 46 as can be seen. With this type of assembly a highly efficient and economical method can be employed for securing the cup in place on the two-piece piston while simultaneously insuring substantial cooling of the undersurface 40 of the piston head 20.

The interaction of the cup 36 with the lowermost land 46 is more clearly shown in FIG. 2 of the drawings. There it can be seen that the outer portion of the cup 36 includes an offset 56 which fits under the land bottom 58. The lip 50 also includes lip outer surface 54 and a rolled surface 57. When in place the rolled surface 57 will be complementary to the angle surface 48 as described above and the outer surface 54 will be essentially co-extensive with the corresponding outer surface 52 of the piston. As can be seen from FIG. 2 slots 27 are provided in cup 36 to accommodate pedestals 23 which extend from the undersurface 40 of the piston, to bosses 24 which define holes for piston pin 26.

Figure 3A:
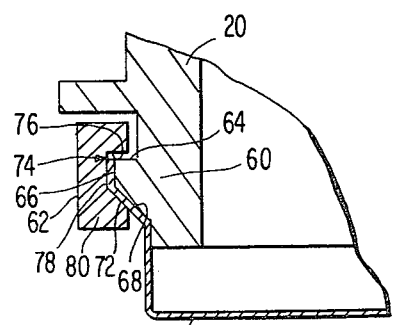
FIG. 3A is an enlarged partial view of FIG. 3.

Another embodiment of the invention is shown in FIGS. 3 and 3A where a third element, i.e. retaining ring 62, is employed with the cup and lowermost land to retain the cup in position between the head and skirt of the two-piece piston. More specifically, the lower land 60 extends from the piston head 20 at a diameter less than the other lands 42 to accommodate the retaining ring 62 for cup 70 in place. The outer diameter of retaining ring 62 is only slightly less than the cylinder bore internal diameter to prevent dislodgement of the cup once placed about lowermost land 60. As can be seen more clearly in FIG. 3A which shows a detail of the lowermost land, this land includes an upper lateral surface 64, an outer surface 66 and a lower angular surface 68 which is at an angle to the axis of the piston of about 45°, although other convenient angles may be used. Piston oil retainer cup 70 includes a flared surface 72 at an angle approximately equal to that of the lower angular surface 68 of land 60.

Retaining ring 62 is configured to envelop lower land 60 and flare 72 to prevent the metal cup pressed onto the piston from being removed therefrom when the piston is placed for operation within the cylinder. For this purpose the ring 62 includes a groove 74 which has a groove inner surface 78 coextensive with outer surface 66, a groove upper lateral surface 76 coextensive with land lateral surface 64 and a groove lower lateral surface 80 coextensive with the lower angular surface 68. In assembly, cup 70 with flared surface 72 is pressed such that the flared surface is in engagement with lower angular surface 68 of land 60, and subsequently ring 62 is placed about flared surface 72 and land 60 to secure cup 70 in position against land 60.

Figure 5:
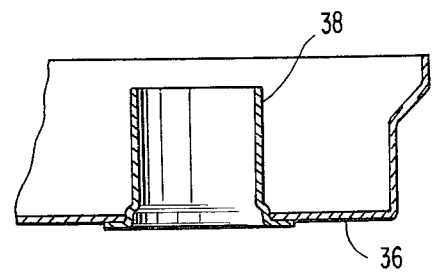
FIG. 5 is a cross-section of FIG. 4 taken along lines 5—5.
Figure 4:
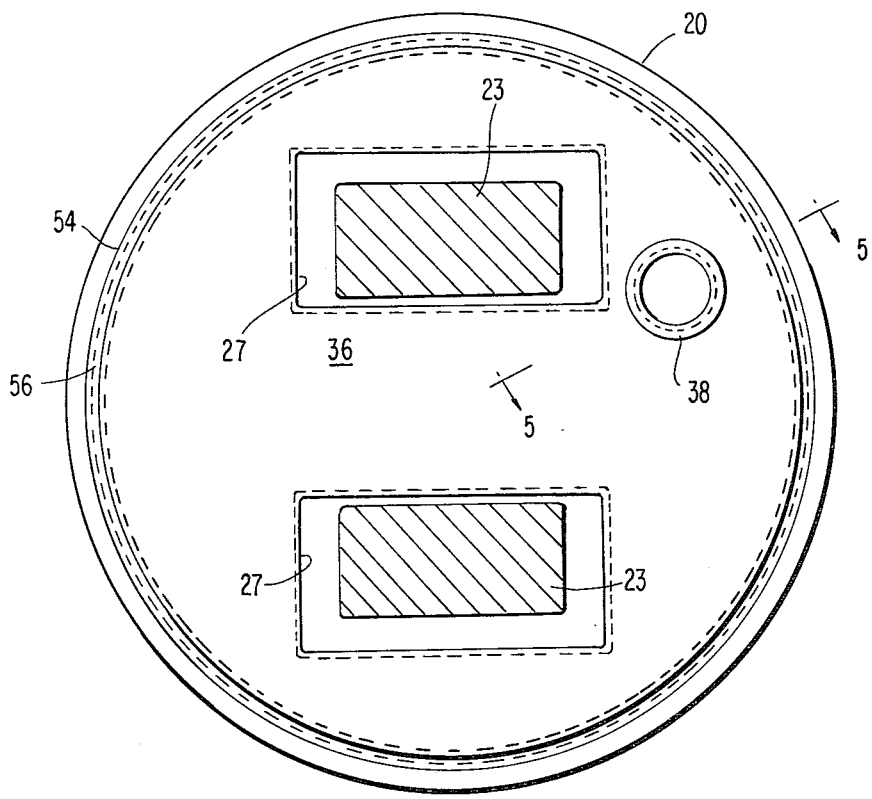
FIG. 4 is a bottom view of a head section for a two-piece piston of the invention.

As can be seen in FIG. 4, there is shown a bottom view of the retaining cup taken along lines 4—4 of FIG. 2. From this view it can be seen that the cup is provided with pedestal slots 27 which are rectangular in configuration and slightly larger than the cross-sectional area of the pedestals 23 to accommodate the pedestals. These pedestals, as can be seen in FIG. 1, extend through the cup to register with holes in the skirt 22 below the head 20. As can be seen in FIG. 5 both grommet 38 and pedestal slots 27 have walls which are at least equal to or slightly less than the outside walls of the oil cup for retaining the cooling oil within the cup.

It can be seen from the above embodiments that a number of advantages flow from the ability to employ the cocktail-shaker action of the two-piece piston in conjunction with a cooling oil retaining cup or other means for splashing cooling fluid against the underside of the piston head. Not only is the ability to use a two-piece piston enhanced by overcoming some of the problems that have accompanied this kind of piston, but also the cost and efficiency in manufacturing are enhanced as a result of the configurations described.

In any event, the above discussion is merely a detailed description of the preferred embodiments. This should not necessarily be interpreted as limiting the full scope of applicant's invention.

It is claimed:

1. A two-piece piston for reciprocal movement within a cylinder of an internal combustion engine comprising:
    (a) an upper section having depending boss means and an open, underside portion therewithin;
    (b) a skirt section below said upper section;

(c) means engaging said boss means and said skirt section for holding said upper section and said skirt section in assembled relationship with said upper section and said skirt section being spaced from each other at their peripheries;

(d) a separate, fluid coolant-retaining means disposed in the space between said upper section and said skirt section, said retaining means having a bottom portion defining a passage therethrough for said depending boss means, said passage in said bottom portion being surrounded by walls extending upwardly from said bottom portion, said walls cooperating with said bottom portion to define an open top to retain coolant therein and to allow the coolant to be splashed upwardly to the underside of said upper section during operation of said piston in an internal combustion engine;

(e) said upper section on the external periphery thereof having holding means for securing said retaining means; and (f) said retaining means being secured to said holding means.

2. The apparatus according to claim 1 wherein said retaining means includes peripheral side walls having an upper portion, said holding means including an annular member, said upper portion of said peripheral sidewalls positioned over said annular member for securing said retaining means to said upper section.

3. The apparatus according to claim 2 wherein said annular member includes an outer surface generally parallel to the axis of said piston, an angled surface between said outer surface and said piston head, and a lower surface generally perpendicular to the axis of said piston, said upper portion of said peripheral walls of said retaining means include complementary surfaces to the surfaces of said annular member wherein said upper portion of said peripheral wall includes a complementary angled surface for engaging the angled surface of said annular member, a complementary outer surface for extending coextensively with the outer surface of said annular member and a complementary undersurface which extends at least partially under said annular member adjacent thereto toward the center of the piston.

4. The apparatus according to claim 3 wherein said annular member has an outer diameter cooperating with the retaining means when secured to said annular member to provide a combined dimension which will not interfere with the operation of the piston within a cylinder.

5. The apparatus according to claim 1 wherein said means for securing said retaining means to said annular member includes a ring for engaging an upper portion of the outer peripheral side wall of the retaining means between the ring and said annular member.

6. The apparatus according to claim 5 wherein said annular member includes an angled portion at an angle to the axis of the piston, said outer peripheral wall of said retaining means includes a flared portion flared at an angle substantially identical to the angled portion of said annular member and complementary thereto, said ring defining a groove for securing said flared portion adjacent to said angled portion of said annular member to ultimately secure the retaining means to the upper section of the piston.

7. The apparatus according to claim 6 wherein said annular member further includes an outer surface substantially parallel to the axis of said piston and an upper surface substantially perpendicular to the axis of said piston, said ring includes said groove having a complementary outer surface for engaging the outer surface of said annular member, and a complementary lateral surface for extending over and adjacent the upper surface of said annular member, the dimensions of said annular member and the ring combine with the piston head section the outer diameter of the outermost surface to be less than the inner diameter of the cylinder such that the ring does not interfere with the operation of the piston while simultaneously interaction of the ring with the cylinder walls and the annular member prevent the ring and ultimately the retaining means from being disengaged from the piston head.

8. The apparatus according to claim 7 wherein said upper section is made from iron containing material and said skirt section is made from aluminum containing material.

9. A two-piece piston for reciprocal movement within a cylinder of an internal combustion engine comprising:
(a) an upper section having depending boss means, said boss means having a bore for receiving a pin, said upper section having an open underside portion therewithin, and said upper section being made of iron;
(b) a separate coolant-retaining means depending from and within said upper section substantially throughout the cross-section of said upper section, said retaining means having a bottom portion defining passages therethrough for said depending boss means, said passages in said bottom portion being surrounded by walls extending upwardly from said bottom portion, peripheral side walls extending upwardly from said bottom portion and spaced from said walls surrounding said passages, said retaining means having a coolant passage for fluid coolant directed under pressure from beneath said upper section toward said underside portion, said walls cooperating with said bottom portion to define an open top to retain coolant therein and to allow coolant to be splashed upwardly to the underside of the upper section during operation of said piston in an internal combustion engine;
(c) said upper section having an annular member extending outwardly from a lower portion of said upper section and around the circumference of said upper section;
(d) a skirt section assembled to said upper section, the skirt section having bores corresponding to and coaxial with bores in said upper section for receiving said pin to hold said upper and skirt sections in assembled relationship, said upper section and said skirt section being spaced from each other at their peripheries, and said retaining means being located in the space between said upper section and said skirt section; and
(e) a ring defining an annular groove for engaging the peripheral sidewall of said retaining means between said ring and said annular member.

10. A two-piece piston for reciprocal movement within a cylinder of an internal combustion engine comprising:
(a) an upper section having depending boss means and an open, underside portion therewithin;
(b) a skirt section below said upper section;
(c) means engaging said boss means and said skirt section for holding said upper section and said skirt section in assembled relationship with said upper section and said skirt section being spaced from each other at their peripheries;

(d) a separate fluid coolant-retaining means disposed in the space between said upper section and said skirt section, said retaining means having a bottom portion defining a passage therethrough for said depending boss means, said passage in said bottom portion being surrounded by walls extending upwardly from said bottom portion, peripheral sidewalls extending upwardly from said bottom portion and spaced from said walls surrounding said passage, said retaining means having a passage for fluid coolant directed under pressure from beneath said upper section to said underside portion through said retaining means, said walls cooperating with said bottom portion to define an open top to retain coolant therein and to allow the coolant to be splashed upwardly to the underside of the upper section during operation of said piston in an internal combustion engine;

(e) said upper section having an annular member extending substantially entirely about the entire circumference at a lower portion of said upper section; and (f) means for securing said retaining means to said annular member, said securing means including an upper portion of said peripheral sidewalls rolled over an upper surface of said annular member.

11. The apparatus according to claim 10 wherein said annular member is a land formed at least in part by a circumferential groove on the external periphery of said upper section of said piston and said upper surface of said land being a lower surface of said groove over which the upper portion of said outer peripheral side walls are rolled for securing said retaining means to said upper section.

12. The apparatus according to claim 10 wherein said securing means includes a ring for engaging said annular member and for engaging an upper portion of said peripheral side walls of said retaining means between said ring and said annular member.

13. The apparatus according to claim 1 wherein said boss means has a bore therein, said skirt section has a bore aligned with said bore in said boss means when said upper section and said skirt section are in assembled relationship, and said means engaging said boss means comprises a pin received in said bore.

* * * * *